United States Patent [19]
Balatoni et al.

[11] 3,882,191
[45] May 6, 1975

[54] BLEND OF THERMOPLASTIC POLYURETHANE ELASTOMER, POLYVINYL CHLORIDE RESIN AND CHLORINATED POLYETHYLENE

[75] Inventors: Julius A. Balatoni, Waterloo; Som N. Khanna, Guelph; Wayne S. Mills, Kitchener, all of Canada

[73] Assignee: Uniroyal Ltd., Montreal, Canada

[22] Filed: Mar. 29, 1973

[21] Appl. No.: 345,924

[52] U.S. Cl...... 260/859 PV; 161/227; 260/31.8 M; 260/31.8 N; 260/42.28; 260/45.7 P; 260/45.8 N; 260/45.85; 260/830 P; 260/836; 260/837 R; 260/837 PV; 260/858; 260/859 R
[51] Int. Cl. ........................................... C08G 41/04
[58] Field of Search...................... 260/859, 859 PV

[56] References Cited
UNITED STATES PATENTS
3,429,948  2/1969  Massoubre .......................... 260/859
3,594,449  7/1971  Binder ................................ 260/859

FOREIGN PATENTS OR APPLICATIONS
1,119,041  7/1968  United Kingdom................. 260/859

*Primary Examiner*—Paul Lieberman
*Attorney, Agent, or Firm*—James J. Long

[57] ABSTRACT

Blends of thermoplastic polyurethane elastomer, polyvinyl chloride resin and chlorinated polyethylene have good processing characteristics and are useful for making calendered sheet and film, coated fabrics, expanded articles, conveyor belts, etc.

2 Claims, No Drawings

BLEND OF THERMOPLASTIC POLYURETHANE ELASTOMER, POLYVINYL CHLORIDE RESIN AND CHLORINATED POLYETHYLENE

This invention relates to a blend comprising thermoplastic polyurethane elastomer, polyvinyl chloride resin, and chlorinated polyethylene.

Thermoplastic polyurethane elastomer exhibits excellent physical properties such as high tensile strength, good low temperature flexibility and abrasion resistance. Unfortunately, it is extremely difficult to process on equipment ordinarily used for processing thermoplastics (e.g., mills, calenders).

Polyvinyl chloride resin by itself exhibits good ultraviolet light stability, but unfortunately it does not have the strength properties that are sometimes required.

Chlorinated polyethylene exhibits good low temperature properties. However, its strength properties - hot or cold - are lower than desirable for many applications.

The present invention is based on the discovery that a blend comprising thermoplastic polyurethane elastomer, polyvinyl chloride resin, and chlorinated polyethylene, offers surprising and unexpected major advantages, both in physical properties (including resistance to heat, humidity, weathering, cold cracking and discoloration due to exposure to ultraviolet light) and in processing characteristics, over the individual polymers or over various other combinations of the polymers. In addition, this invention achieves these results in a blend which is more economical than the thermoplastic polyurethane elastomer alone.

In one aspect the invention is directed to a ternary blend of the polymers in the following approximate proportions (based on the weight of the three polymers):

|  | Broad | Preferred |
| --- | --- | --- |
| Thermoplastic polyurethane elastomer | 30–85% | 40–60% |
| Polyvinyl chloride | 60–5 % | 15–25% |
| Chlorinated polyethylene | 60–10% | 15–30% |

Normally the proportions of polyvinyl chloride/chlorinated polyethylene vary within the ratios of 4:1 and 1:4. To the foregoing may be added other ingredients known to the art, such as pigments, stabilizers and fillers.

In a modification of the invention the polymer blend contains a plasticizer, particularly a low volatility monomeric or polymeric plasticizer, in amounts of from 5 to 40%, based on the weight of the total formulation. This form of the invention is particularly useful where higher flexibility or a softer feel is desired. In the mixes containing polymeric plasticizer, strength properties are maintained and the material generally becomes more pliable and softer. The hand and feel properties are improved while the processing properties are enhanced.

The thermoplastic polyurethane elastomer used in the invention is a conventional material (see, for example "Polyurethane Technology", by Bruins, Interscience Publishers, pages 198–200; also "Modern Plastics Encyclopedia", 1968, page 289). Examples are polyether based polyurethanes made from 2 moles of polytetramethylene ether glycol, 3 moles of MDI and 1 mole of 1,4-butanediol, and polyester based polyurethanes similarly derived from 1,4-butanedioladipic acid polyester and MDI (Rubber Chemistry and Technology, Vol. 35, 1962, page 742, Schollenberger et al.). Commercially available materials of this category include Estane (trademark) and Roylar (trademark). Many such products may be described as reaction products of a polymeric polyol (e.g., a polyester glycol or a polyether glycol) with an organic polyisocyanate, usually a diisocyanate, frequently along with a low molecular weight bifunctional material having two reactive hydrogens, such as a glycol or diamine (see also U.S. Pat. No. 3,462,326, Steele et al., Aug. 19, 1969, especially col. 3, lines 1 to 35; also U.S. Pat. No. 3,678,129, Fischer, July 18, 1972, col. 1, line 65 to col. 2, line 9 and col. 3, lines 19–30.) The 350°F melt flow index is usually from 0 to 100. Thermoplastic polyurethane elastomer is a high molecular weight material devoid of olefinic unsaturation; it does not contain available —NCO groups.

The polyvinyl chloride resin employed in the invention is a well-known conventional material. It is represented by such commercially available resins as "Marvinol" or "Esso PVC" (trademarks). Frequently the polyvinyl chloride resin employed has K value (a function used as a measure of molecular weight; see H. Fikentscher, Cellulosechemie 13, 60 [1932]) from 50 to 79.

The chlorinated polyethylene employed in the invention is likewise a known material, being a resin produced by chlorination of linear polyethylene. Various forms of chlorinated polyethylene resins employed may be described as elastomers having glass transition temperatures of —30°C. to —20°C. and chlorine contents of 25 to 50 wt.%. Their mechanical strength properties are a function of the molecular weight of polyethylene used, degree of residual crystallinity and the arrangement of chlorine atoms on the backbone. These materials are represented by the commercially available product known as "Tyrin"(trademark).

Most of the commercially available PVC plasticizers can be successfully incorporated into these blends. The common types include monomeric or polymeric esters of adipic, azelaic, oleic, phosphoric, sebacic, stearic, phthalic or trimellitic acid and of allyl alcohol, glycerol, butanol, isobutanol, pentanol(s), (methyl) cyclohexanol(s), 2-ethylhexanol, octanol(s), benzyl alcohol, tetrahydrofurfuryl alcohol, propylene glycol, diethylene glycol, dipropylene glycol, triethylene glycol, tripropylene glycol, polyethylene glycol(s) or polypropylene glycols. The choice of type, of course, will be dictated by the desired level of properties and performance of the end product.

Low volatility plasticizers such as polymeric plasticizers are preferred.

These have molecular weights in the range from about 1000 to about 8000. Typical examples are polyesters derived from e.g. propylene glycol and dicarboxylic acids, especially adipic and sebacic acids, as described by H. Hopff in Chapter 8 Plasticization and Plasticizer Processes, Amer. Chem. Soc. Advances in Chemistry, Series 48 (1965) (200 p.), edited by R. F. Gould.

Suitable stabilizers for use in the present blend include those conventionally used for stabilizing the polymers employed, e.g. barium-cadmium stearate, laurate or oleate (7 to 15% metal content) (e.g. Synpron 763, trademark Ferro 75-001, trademark); liquid epoxy resin (e.g. bis [3,4-epoxy-6-methylcyclohexylmethyl] adipate, Ciba CY 178, trademark); phosphate chelator (e.g. tri [nonylated phenyl] phosphite, Mark C, trademark); ultraviolet absorber (e.g. 2-[2'-hydroxyphenyl-5-ethyl] benzotriazole, Tinuvin 328, trademark); antioxidant (e.g. tetrakis [methylene 3-(3',5'-di-t-butyl-4'-hydroxyphenyl) propionate] methane, Irganox 1010, trademark).

The resins employed should be dried (for example by heating to drive off any water) before blending. Moisture (readily absorbed by the thermoplastic polyurethane resin) results in lowered physical properties.

To prepare the blend, the resins may first be premixed, for example in a dry blender. This preblend is then fused and fluxed while working at elevated temperature (e.g., 320°–400°F, preferably 330°–360°F), for example in an internal mixer such as a Banbury mixer, or on an open roll mill.

The resulting blend is a millable thermoplastic composition that has exceptional calenderability. Calendered sheet of excellent quality can be obtained with, for example, a thickness of about 0.005 to 0.060 inch (embossed with an appropriate grain on either side if desired). The stock readily releases from an embossing roll and no calendering aids need be incorporated. No tracking problems are observed on the calender. The stock can be vacuum formed readily and heat sealed on ordinary heat sealing devices. This sheet can be vacuum formed to make automotive crash pad coverstock, for example.

The blend has sufficient hot strength to be calendered into thinner films (e.g. 1 to 6 mil thickness) if desired. These films can be calendered or laminated onto fabric to produce, for example, upholstery and clothing materials, which are superior to standard vinyl fabrics and provide many of the advantages of urethane-coated fabrics. The blends are also suitable for hot-melt coatings. The coated fabrics have excellent hydrolytic stability, toughness, puncture and abrasion resistance.

The blends are useful in fast and efficient manufacture of conveyor belting. The composition can be calendered or extruded, in a thickness of, for example 0.005 to 0.250 inch, onto each side (successively or simultaneously) of supporting fabric made of natural or synthetic fiber such as cotton or nylon, or a wire reinforcing fabric, as conventionally used in conveyor belting. This produces a fabric sandwiched between two layers of coverstock. The process can be repeated many times to produce a multi-ply belt. The resulting belt possesses high physical strength properties, good resistance to wear and abrasion, and at the same time still maintains good low temperature performance. Making pouring or casting problems associated with making belts from liquid urethanes are eliminated, as well as problems associated with long controlled cure cycles used in rubber belt manufacture. Problems arising from difficult to predict shrinkage variations are avoided. Repairs can be achieved quickly and efficiently since the materials are thermoplastic.

The blend may be mixed with a chemical blowing agent to make expanded products useful in energy (impact) absorption, shoe soles, etc. Suitable blowing agents include those described in U.S. Pat. No. 3,041,193, June 26, 1962, Hamway et al., column 3, lines 45–52.

The properties of the blend of the invention will, of course, vary with the proportions of the three polymers and the specific polymers selected (e.g. the hardness of the thermoplastic polyurethane, the K value of the polyvinyl chloride resin, the molecular weight and chlorine content of the chlorinated polyethylene, etc.) and with the amount and kind of plasticizer.

The following examples, in which all quantities are expressed on a weight basis, will serve to illustrate the practice of the invention in more detail.

EXAMPLE 1

The thermoplastic polyurethane elastomer (hereinafter referred to as "TPU") employed is a polyether polyurethane prepared by reacting a polyol blend comprising one equivalent of polytetramethylene ether glycol (1000 molecular weight) and two equivalents of 1,4-butanediol with methylene bis (4-phenylisocyanate), the ratio of isocyanate to polyol blend being such as to result in material with a 350°F melt flow index of 50 to 100. The polyvinyl chloride resin (PVC; Marvinol 2002, trademark) employed has a K value of 69, an inherent viscosity of 0.99, a specific viscosity of 0.41 and an ASTM oil absorption of 29. The chlorinated polyethylene ("CPE") employed has a chlorine content of 48% and a melt viscosity of $19 \times 10^3$ poises; it is an elastomeric material (tension set 14%, ASTM D 412), having a Shore A hardness of 65, a specific gravity of 1.25 and a crystallinity less than 2%, commercially available as Tyrin (trademark) QX2243.25. The three polymers are heated at 230°F for 4 hours to minimize the possibility of moisture being present. The polymers and other ingredients are premixed in a Hobart mixer at low speed, in the proportions shown in the following recipe:

| Material | Recipe Parts | % |
|---|---|---|
| TPU | 100.0 | 47.1 |
| PVC | 60.0 | 28.3 |
| CPE | 40.0 | 18.8 |
| Stabilizers | 11.0 | 5.1 |
| Pigment | 1.5 | 0.7 |
| Total | 212.5 | 100.0 |

The stabilizers may be, for example, a mixture of 4 parts of barium-cadmium oleate, 6 parts of bis (3,4-epoxy-6-methylcyclohexylmethyl) adipate, 0.5 part of tri (nonylated phenyl) phosphite, 0.25 part of tetrakis [methylene 3-(3', 5'-di-t-butyl-4'-hydroxyphenyl) propionate] methane and 0.25 part of 2-(2'-hydroxyphenyl-5-ethyl)benzotriazole. The pigment may be, for example, titanium dioxide.

The resulting pre-blend is masticated in a Banbury mixer unitl a temperature of 340°–350°F is reached; mixing is continued at this temperature for three minutes to insure fluxing of the mix. The blend is then dumped onto a mill heated to 300°–310°F; the stock bands readily and is slabbed off the mill.

Samples of a blend of the foregoing kind yielded the following test results:

| | |
|---|---|
| Tensile strength | 3400–4300 psi |
| Elongation at break | 370–425% |
| Hardness (Shore A) | 90 |
| Wear resistance (General Motors TM 31–65): | no loss of material |
| Resistance to scuff and mar (General Motors TM 31–55): | slight mar only |
| Cold cracking (General Motors Coverstock Specification 22–4): | no cracking during 1 hour at -20°F |
| Tear strength (ASTM D 624–54; die C) | 400 lbs./in. |

To demonstrate the reprocessability of the composition of the invention, a blend as described is tested on a Brabender Plasti-Corder under the following conditions: Shear rate, 60 rpm; Sample size, 56.0 g.; Sensitivity range, 15 (× 1.0); Duration of test, 44 min.; and Jacket temperature, 310°F. The results were as follows: Maximum torque at $t=$ 1 min., 2700 meter-grams; Torque at $t=$ 7 min., 1900 meter-grams; Torque at $t=$ 40 min., 1700 meter-grams; From $t=$ 7 min. to $t=$40 min. the curve is linear with a shallow slope of −1/7. Past $t=$ 40 min. there is no indication of an upward trend.

A similar sample is repeatedly milled for periods of 10 minutes; physical properties are determined after each period. Ten such milling periods are required before definite decreases in tensile strength and molulus are evident.

These results indicate that the blend of the invention can be reprocessed repeatedly, thus virtually eliminating scrap.

To demonstrate the aging properties of the blend, various aging tests are carried out on samples of the composition, and the physical properties are compared before and after the tests. The most severe of these tests is an EMMAQUA (see Polymer Stabilization, W. L. Hawkins Chapter 10, p. 409 Wiley Interscience [451 p. 1972]; 140,000 Langleys of absorption). 67% of the original tensile strength and 60% of the original elongation are retained. The cold crack temperature increased by 10° to 20°F. (e.g. from about −40° to about −20°F). These results indicate that the present blend has excellent resistance to outdoor weathering and ultraviolet light cracking. In this respect the blend is superior to conventional ABS thermoplastics.

EXAMPLE 2

Example 1 is repeated, using the following recipe which includes a polymeric plasticizer:

| Ingredient | Recipe % |
|---|---|
| TPU | 39 |
| PVC | 23 |
| CPE | 15 |
| Plasticizer | 15 |
| Stabilizers | 7 |
| Pigment | 1 |
| | 100 |

The plasticizer may be "Plastolein 9765" (trademark), a polyester derived from propylene glycol and adipic acid (molecular weight, 3500; acid value, 3.0; hydroxyl value, 20). The stabilizers may be as in Example 1, in the same relative proportions. The pigment may be as in Example 1.

The polymers were dried as in Example 1; a preblend was made which was then masticated in the Banbury to a stock temperature of 320°F. The batch was dropped onto a mill (270°F) and sheeted out. Physical properties, reprocessability and aging are tested as in Example 1, with similar results. The nap side of Cotswold 5019 fabric, weighing 5.8 ounces per square yard, is coated with the composition by calendering at about 300°–320°F to produce coatings of 0.004 and 0.006 in. thickness. The coated fabrics have excellent weathering properties, resist hydrolysis and solvents, and have low temperature, strength and wear properties superior to vinyl-coated fabrics.

EXAMPLE 3

To make blown products, 10 parts of a commercial blowing agent, Celogen AZ (trademark; 50% azodicarbonamide; 50% di-2-ethylhexyl phthalate) is mixed with 90 parts of the unplasticized blend of Example 1 or the plasticized blend of Example 2, on a mill at a temperature below the decomposition temperature of the blowing agent. Samples of the blends are compression molded at a temperature below the decomposition temperature of the blowing agent. The molded shapes are placed in an oven heated at 320°F. and allowed to expand. After about an hour the resulting cellular articles are removed. In contrast with blown plasticized vinyls, the articles are remarkably resistant to cracking at low temperatures, especially those formed from the plasticized blends. In a 180° bend test, samples cracked between −30°F. and 0°F. The products are useful in automotive energy-absorbing bumpers, gymnasium mats, flotation devices for oil booms, shoe soles, etc.

EXAMPLE 4

TPU, PVC and CPE are mixed on a two-roll rubber mill until the mixture fuses. The TPU content is 50% based on the weight of the three polymers. The ratio of CPE to PVC is varied from 90:10, to 80:20, 70:30, 60:40, or 40:60. No sticking can be detected either during the milling or upon subsequent calendering.

EXAMPLE 5

Example 1 is repeated, except that the TPU is a 65 Shore D polytetramethylene ether glycol based material (specific gravity, 1.17; tensile strength at break, 7600 psi; elongation at break, 400%) and the mix is blended on a mill at 360°F. The tensile strength is 3716 psi, elongation 325%, and tear strength 200 pounds per linear inch.

EXAMPLE 6

Different concentrations of a polymeric plasticizer (e.g. "Plastolein 9765") are added to 200 parts of a blend as described in Example 1. During milling and calendering no sticking or other processing problems can be detected. The blends have excellent physical properties as follows:

| Parts Plasticizer | Tensile psi | Elongation % | Tear pli | Hardness (Shore A) |
|---|---|---|---|---|
| 5 | 3448 | 300 | 349 | 92 |
| 10 | 3631 | 325 | 365 | 92 |
| 15 | 3686 | 350 | 385 | 91 |
| 20 | 3680 | 350 | 330 | 91 |

EXAMPLE 7

In this example, the plasticized blend of Example 2 is used to make a fabric-reinforced conveyor belt. The fabric used is a conventional nylon reinforcing fabric for conveyor belts (fabric weight 2.2 ounces per square yard, thickness about 0.005 inch). A coating of the composition about 0.05 inch thick is calendered onto one side of the fabric. In a second pass, a coating about 0.04 inch thick is calendered onto the other side of the fabric, thus producing a double-coated fabric in which the nylon reinforcement is sandwiched in between two unequal thicknesses of the composition. The resulting belt possesses high physical strength properties and good resistance to wear and abrasion. At the same time it still maintains good low temperature performance.

Actual tensile test values were as follows:

| Nylon Fabric Coated: | Tensile p.s.i. | |
|---|---|---|
| | Weft(Fill) | Warp |
| one side only (thickness, 0.062 in.) | 3354 | 4258 |
| both sides (sandwich construction, thickness 0.105 in.) | 3619 | 4530 |

We claim:

1. A method of making a shaped article comprising the steps of blending
    A. a high molecular weight thermoplastic polyurethane elastomer devoid of ethylenic unsaturation and free —NCO groups which is a reaction product of a polymeric polyol, an organic polyisocyanate and a low molecular weight bifunctional material having two reactive hydrogens,
    B. polyvinyl chloride resin, and
    C. an elastomeric chlorinated polyethylene having a glass transition temperature of −30°C to −20°C. and a chlorine content of 25–50% by weight,
    the amount of (A) being 40–60%, the amount of (B) being 15–25%, and the amount of (C) being 15–30%, based on the weight of the three polymers, the resulting blend being repeatedly reprocessable and being devoid of curing agent, and forming the resulting blend into a shaped article without cure.

2. A method as in claim 1 in which the said shaped article is formed by calendering.

* * * * *